Patented Apr. 5, 1949

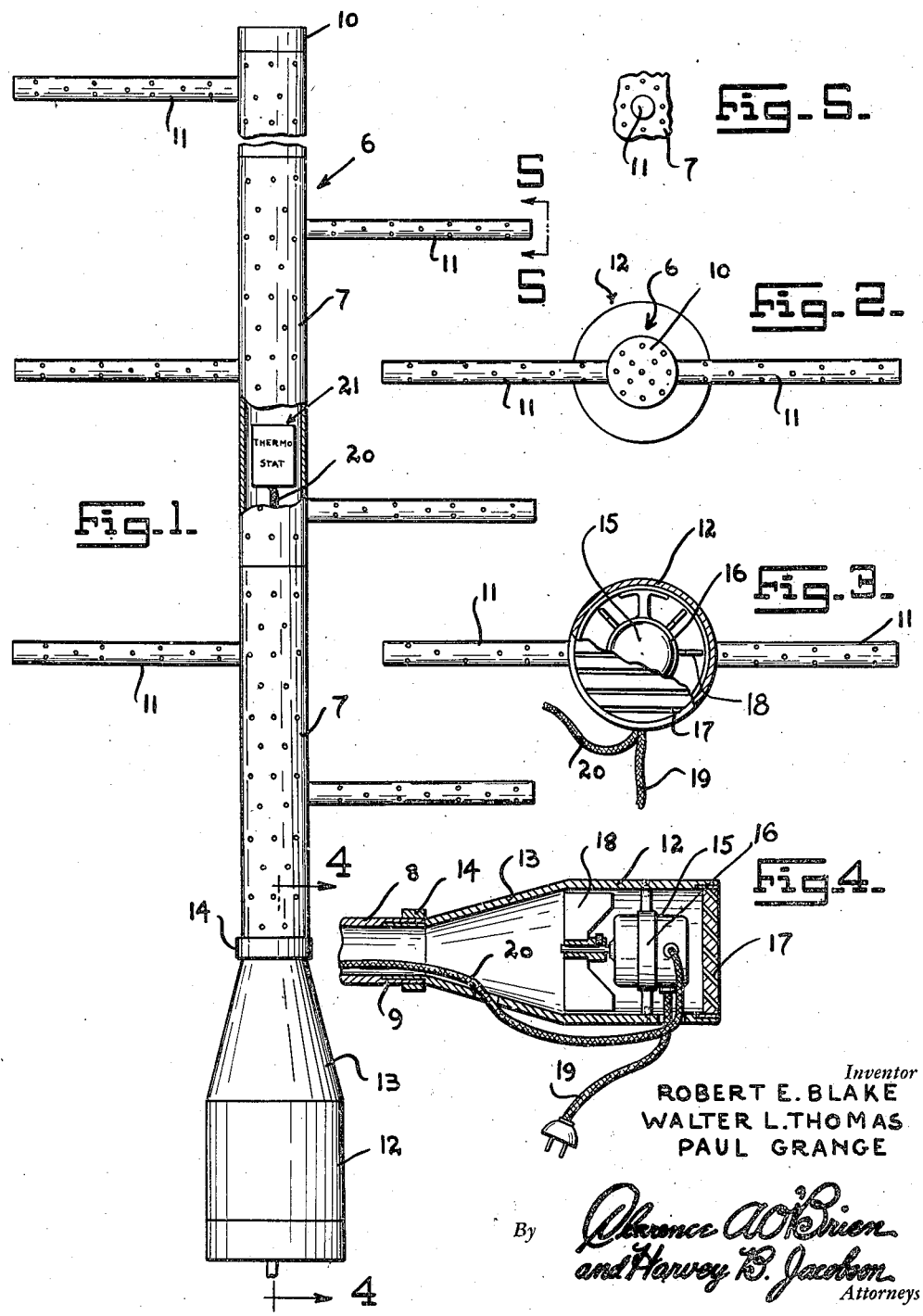

2,466,362

UNITED STATES PATENT OFFICE 2,466,362

DRYING AND DEHUMIDIFYING MEANS FOR CORNCRIBS AND THE LIKE

Robert E. Blake, Walter L. Thomas, and Paul Grange, Mason City, Iowa

Application May 29, 1945, Serial No. 596,516

2 Claims. (Cl. 98—56)

This invention relates to ways and means of adequately and satisfactorily drying corn, hay and similar grains and products, this with a view toward minimizing spoilage and fire hazards such as are traceable to spontaneous combustion brought about by overheated grain, in a well-known manner.

The structure we have in mind, operates in a horizontal plane and can perhaps be best understood by more or less restricting it to its use in connection with corn in a crib or hay in a barn or equivalent enclosures. It is well known that newly made hay put into a barn, when just a little green, tends to heat, this causing the hay to be musty and often starting, by spontaneous combustion, a dangerous fire likely to burn the barn or building down. In order to overcome this and prevent spoilage and keep the corn and hay substantially dry, we propose introducing into the central region thereof a so-called dehumidifier thus to remove dampness and heat and to maintain the produce in proper shape at all times.

Having farms of our own we have experienced corn spoilage to some degree year after year, especially in the center of the corn cribs. With the vast amount of mechanical corn pickers in use more corn spoilage is known to result. The reason is that the corn when picked by hand did not pile up in the crib too fast, and had time to dry out. But with pickers it is piled up in a day or two and usually has attending batches of silks and husks, and these being packed in the cribs, overheating and dampness is bound to produce objectionable results.

With the foregoing in mind we have perfected a simple and practicable dehumidifier and disposal conduit having a main horizontal, tubular conduit and auxiliary side branches in said plane, there being a dehumidifying humidostat in the main branch and also a motor-driven fan at the discharge end thereof, whereby to provide for the desired circulation and to carry off the objectionable damp air and to thus achieve the desired drying results.

Other features and advantages will become more readily apparent from the following description and the accompanying illustrative drawing.

In the drawings:

Figure 1 is a top plan view of the horizontally positioned apparatus, with a portion broken away and shown in section and disclosing a dehumidifying structure in accordance with the principles of the present invention.

Figure 2 is an end view observing the structure in the drawings from the top of the sheet down.

Figure 3 is a view observing the other end, from the bottom of the sheet up, with a portion broken away and shown in section.

Figure 4 is a section taken approximately on the plane of the line 4—4 of Figure 1.

Figure 5 is a fragmentary view observing the outer end of one of the auxiliary branches or arms, this being on the approximate line 5—5 of Figure 1.

Referring now to the drawings by distinguishing reference numerals, it will be seen that the main conduit of the apparatus is in the form of a horizontally placed, elongated, cylindrical duct or main conduit 6. This is made up of cylindrical apertured sections 7 of appropriate material connected in telescopic relation by interengaging tube portions 8 and 9 (see Figure 4) forming slip joints. It is desired to provide a structure wherein the parts are separately connected together so as to increase or decrease the overall length depending on the building, crib or other enclosure in which it is used. A suitable closing cap 10 is on one end and this is appropriately apertured to provide a screen as shown in Figure 2. This is to prevent the entrance of mice and similar pests into the tubular passage of the conduit. At suitable points, the main conduit 6 is provided with staggered, outwardly or radially extending smaller apertured tubular branches or limbs 11. These are apertured but closed at their outer ends. They serve obviously to distribute the range of overall utility of the device when used in hay lofts, corn cribs and the like.

At the discharge end, where the circulation is produced, we provide a cylindrical housing 12 with a reduced portion 13 connected with the main conduit 6 and held assembled by an appropriate ring or collar 14. This housing serves to accommodate an electric motor 15 supported by an appropriate spider structure 16 (see Figure 3). The discharge end of the housing is provided with a closing disk, ring or the like, provided with louvres 17 for discharging moist air. The motor is provided, of course, with a suitable air circulation fan 18 and connects in a power line 19, and is also hooked up by a similar line 20 to a humidostat 21, as shown in Figure 1. This instrument is the detector of moisture and can be set at any percentage of moisture control. We have found that the Minneapolis-Honeywell Regulator Company produces the desired types of dehumidifying thermostats such as will serve our purposes well. Thus, the motor is turned off and on automatically depending upon the dampness and moisture conditions of the area in which the dehumidifying means is located.

For corn cribs which are usually 8' wide, the auxiliary tubes 11 should be at least 2' long. After the cribs are filled about 2' this system is laid on the corn and then the balance of the crib is filled. Usually the corn in the center of the crib is where the spoilage takes place on account of the corn being elevated and dropped in the center of the crib which causes the husks, silks and shelled corn to more or less pack through the center of the crib stopping circulation of the air and causes moldy and spoiled corn. Should the crib be narrower than 8' the auxiliary tubes may be omitted.

A careful consideration of the foregoing description in conjunction with the invention as illustrated in the drawings will enable the reader to obtain a clear understanding and impression of the alleged features of merit and novelty sufficient to clarify the construction of the invention as hereinafter claimed.

Minor changes in shape, size, materials and rearrangement of parts may be resorted to in actual practice so long as no departure is made from the invention as claimed.

We claim:

1. A drying and dehumidifying device for haylofts, corn cribs and the like comprising a sectional main conduit adapted to be supported for position in a horizontal plane, and a plurality of auxiliary conduits connected at their inner ends to and branching laterally from said main conduit, the latter and said auxiliary conduits being apertured, said auxiliary conduits being closed at their outer ends and said main conduit having an apertured cap substantially covering its inner end, an enlarged motor housing on the outer end of said main conduit adapted to communicate with the atmosphere, an electric motor in said housing, a fan mounted for operation on said motor and situated and confined in said housing, said housing being provided at its discharge end with louvre means, an automatic humidostat mounted in said main conduit, and an operating connection between said humidostat and motor to turn the motor on when conditions are such as to require aspiration and removal of damp air and consequent drying of the hay or corn, as the case may be.

2. A drying and dehumidifying device for haylofts, corn cribs and the like comprising a main conduit adapted to extend in a horizontal plane across a corn crib and provided with a multiplicity of apertures, a plurality of auxiliary conduits connected at their inner ends to and radiating from diametrically opposite sides of said main conduit and arranged in longitudinally spaced relatively staggered relationship, said auxiliary conduits being apertured and closed at their outer ends, said main conduit being closed substantially by an apertured cap at its inner end, an enlarged housing attached to the opposite outer end of said main conduit, louvre means fitted into the outer end of said housing, an electric motor mounted and confined in said housing and provided with a fan also operable and confined in said housing, said fan being adapted to aspirate moistened air from points within the vicinity of said conduits, an automatically operable humidostat situated for operation at a predetermined point in said main conduit, and an operating connection between said humidostat and motor, said connection serving to turn the motor on when conditions surrounding the conduit are such as to require the aspiration and removal of damp air and to consequently dry the hay, corn or other material adjacent to said conduits.

ROBERT E. BLAKE.
WALTER L. THOMAS.
PAUL GRANGE.

REFERENCES CITED

The following references are of record in the file of this patent:

UNITED STATES PATENTS

| Number | Name | Date |
| --- | --- | --- |
| 100,628 | Hoffman | Mar. 8, 1870 |
| 722,118 | Liles | Mar. 3, 1903 |
| 838,248 | Fulton | Dec. 11, 1906 |
| 842,538 | Elward | Jan. 29, 1907 |
| 1,172,105 | Britt | Feb. 15, 1916 |
| 1,522,186 | Hiestand | Jan. 6, 1925 |
| 1,619,417 | Guinan | Mar. 1, 1927 |
| 1,660,555 | Gentslinger | Feb. 28, 1929 |
| 1,890,758 | Townsend | Dec. 13, 1932 |
| 1,977,389 | Kramer | Oct. 16, 1934 |
| 2,196,391 | Gronert | Apr. 9, 1940 |
| 2,213,582 | Hall | Sept. 3, 1940 |

FOREIGN PATENTS

| Number | Country | Date |
| --- | --- | --- |
| 175,495 | Switzerland | May 1, 1935 |
| 301,531 | Great Britain | Nov. 30, 1928 |